May 19, 1942.  J. I. LINER  2,283,378
TEMPERATURE INDICATOR
Filed May 20, 1939
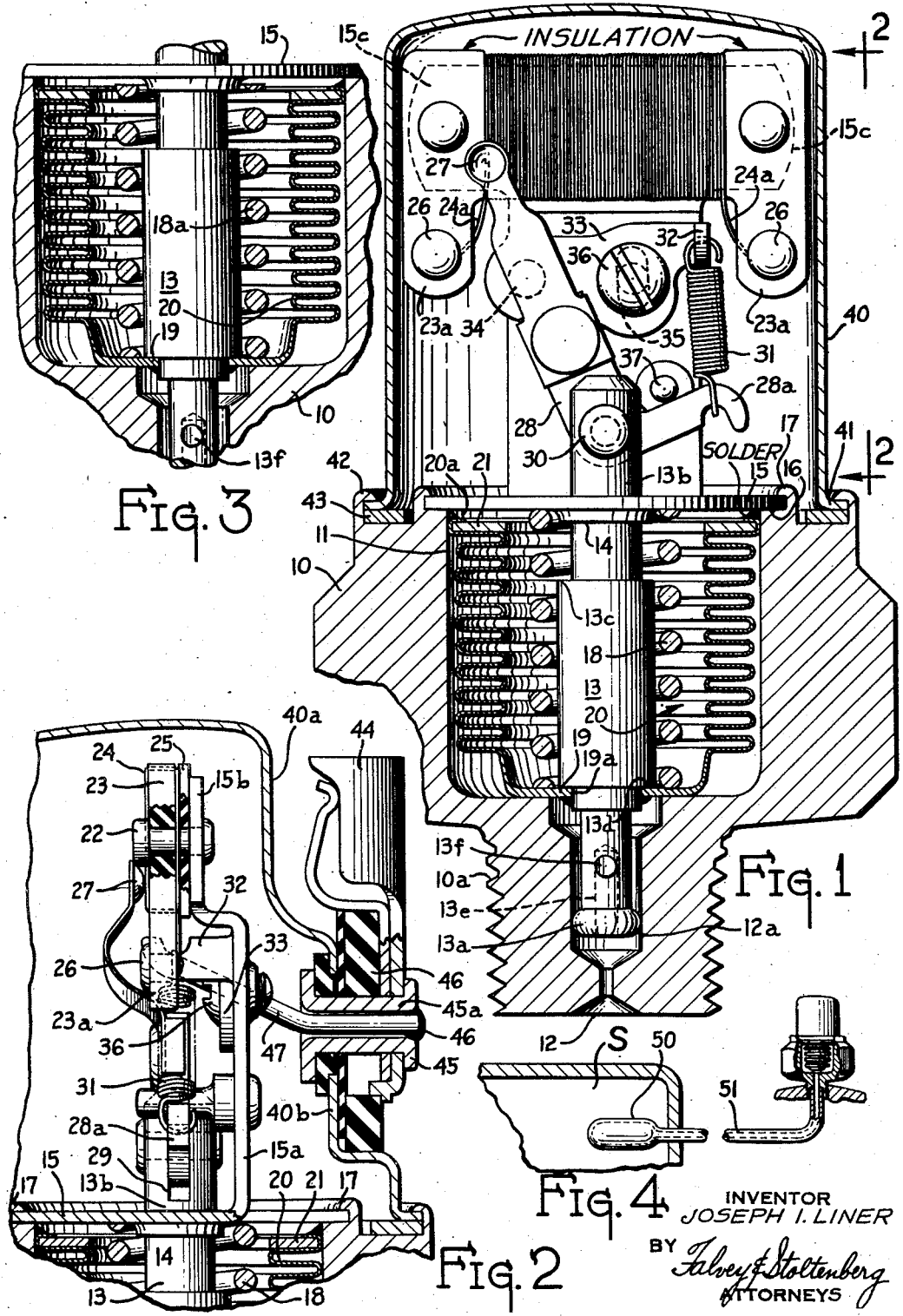
INVENTOR
JOSEPH I. LINER
BY Falvey & Stoltenberg
ATTORNEYS Patented May 19, 1942

2,283,378

UNITED STATES PATENT OFFICE 2,283,378

TEMPERATURE INDICATOR

Joseph I. Liner, Toledo, Ohio

Application May 20, 1939, Serial No. 274,859

5 Claims. (Cl. 201—48)

This invention relates to pressure-responsive devices, more particularly to pressure-responsive devices suitable for actuating a remote electrical indicating device and which is also capable of being readily adapted to measure temperature changes.

In many industrial applications in which pressure-responsive devices are utilized, it is often desirable to have an apparatus which is capable of responding to a relatively wide range of pressure. This type of instrument, however, in general, has a disadvantage that if a large range of pressure is to be indicated on an indicating instrument, the scale divisions are in general very small, so that small changes of pressure will not be accurately indicated on the scale. This is particularly true at the lower scale readings on the indicating instrument where it is often desirable to obtain accurate readings of very low pressures and, at the same time provide a scale capable of indicating pressures over a relatively wide range.

This invention contemplates the provision of a pressure-responsive device which will give accurate readings at low scale values and which will, after a certain predetermined pressure has been attained, change its deflection ratio automatically, so that relatively high pressures may be measured by the same scale on the indicating instrument by using a smaller deflection per unit pressure at the higher pressures than at the low pressures. A structure is contemplated which is capable of being modified for measurement of temperature by modifying the pressure chamber to a closed fluid system which is responsive to the temperature changes to vary the pressure in the pressure-responsive means so as to give an indication at the indicating head which is proportionate to the temperature.

The invention further contemplates the provision of a linkage between the temperaure or pressure-responsive device for acuating a rheostatic device which will have a minimum of lag, so that accurate readings may be attained at the indicating head while the changes progress upwardly or downwardly on the scale.

It is, therefore, an object of this invention to provide a pressure-responsive device which is adapted to respond to low pressure with a relatively high displacement per unit of pressure which will automatically alter its ratio of deflection to a substantially lower displacement per unit of pressure after a predetermined pressure value has been attained.

It is a further object of this invention to provide a pressure-responsive device which will protect the pressure system from leakage should a rupture occur within the device.

It is a further object of this invention to provide a pressure-responsive device which operates a rheostatic device with a minimum of variation between the readings while the pressure is building up and the readings while the pressure is dropping off.

It is a further object of this invention to provide a pressure-responsive device which is capable of being readily adapted to a temperature indicating device.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawing forming a part of this specification wherein like reference characters designate corresponding parts in the several views.

Figure 1 is an elevational view, partly in section.

Figure 2 is an elevational view taken along the line 2—2 of Figure 1.

Figure 3 is an elevational view similar to that shown in Figure 1, showing a modification of the internal arrangements of the pressure-responsive device.

Figure 4 is an elevational view, partly in section, showing an adaptation for measurement of temperature.

Referring particularly to Figure 1 of the drawing, a body portion 10 is provided which has an internal bore 11 to form a cup-shaped receptacle, in which active members of the pressure-responsive device are positioned and by which a pressure chamber is formed to act upon the active members. The lower portion of the body 10 is provided with a threaded boss 10a, which is adapted to attach the body 10 to any pressure system and to place the pressure chamber 11 in communication therewith by a passage-way 12 which is provided in the boss 10a.

A counter-bore 12a, concentric with the chamber 11, is provided between the passage-way 12 and the chamber 11 to form a guide-way for the lower end of a stem 13 which is formed with a knob 13a to fit the bore 12a and allow a sliding relation therebetween to permit ready movement of the stem 13 longitudinally of the bore. The lower end of the stem 13 is provided with a counter-bore 13e which communicates with a transverse bore 13f, to allow the fluid from the fluid-pressure system to flow into the chamber 11, unimpeded by the knob 13b which closes the counter-bore 12a.

The upper end of the stem 13 is provided with a stud 13b of slightly less diameter than the main portion of the stem 13 to form shoulders 13c. The stud 13b is adapted to project through a flanged aperture 14 which is formed in a central location in a plate 15 fitted against a face 16 of the body 10 and held in position thereagainst by a concentric turned-over flange 17 formed on the body 10. In this way, the stem 13 is adapted for longitudinal movement in the chamber 11, and counter-bore 12a cooperating with the knob 13a and the flanged aperture 14 in the plate 15 cooperating with the stud 13b guide the stem 13 during its longitudinal movement. The flange of the aperture 14 is adapted to form a centering seat for a spring 18 which acts between the plate 15 and the bottom 19 of a metallic bellows 20 which is positioned concentrically in the chamber 11 and is adapted to cooperate with the stem 13 by having an aperture 19a, so that the bottom 19 is fitted against a shoulder 13d on the stem 13, being soldered thereto, as is disclosed in Figure 1. The upper end of the bellows 20 is provided with a supporting ring 21 which is fitted to the bellows by means of a turned-over flange 20a adapted to embrace the ring 21, the ring and the flange snugly fitting into the bore of the chamber 11 and are preferably soldered into position therein at a position relatively adjacent the supporting plate 15. The ring and bellows close the chamber 11, so that a fluid-pressure may act on the outside of the bellows, which, upon formation of pressure in the chamber 11, tends to contract, so that the stem 13 will be thrust upwardly (Figure 1) to force the stud 13b through the flanged aperture 14 to actuate devices to be described hereinafter.

The bellows, upon contraction, applies a force to the stem 13 at the shoulder 13d to compress the spring 18 in some proportion to the amount of pressure formed in the chamber 11. The shoulder 13c will abut against the flange of the aperture A on the plate 15 when the pressure formed in the chamber 11 reaches a predetermined maximum pressure for which the device was designed. Upon release of pressure in the chamber 11, the spring 18, acting on the inside of the bellows 20, will thrust its bottom 19 against the bottom wall of the chamber 11 to determine the conditions at zero reading of the device.

The plate 15 is provided with an upstanding portion 15a (Figure 2) which has at its upper end a forwardly displaced parallel portion 15b having lateral extensions 15c to which is attached by means of rivets 22, an insulating plate 23, around which a resistance coil 24 is wound to form a variable resistance unit adapted to cooperate in electric circuit with an indicating head such as is disclosed in Serial No. 151,245, filed June 30, 1937. The turns of the resistance coil 24 are insulated from the portion 15b by means of an insulating plate 25 which is juxtaposed therebetween, being also supported by rivets 22. Adjacent its end, the insulating plate 23 is provided with depending portions 23a, in which rivets 26 are positioned which cooperate with the ends of the resistance coil 24a for convenient electrical connection.

A slide member 27 is provided to cooperate with the resistance coil 24 by being adapted to swing an arc across its surface to vary the resistance effective in an extraneous indicating circuit including an indicating instrument such as mentioned supra. The slide member 27 is adapted to swing in the arc by being mounted upon one arm of a bell-crank member 28 which is fitted into a slot 29 formed in the upper end of the stud 13b of the stem and is held in pivoted relation therewith by means of a pintle 30 which threads aligned apertures in the bell-crank and bifurcations of the stud 13. The other arm 28a of the bell-crank is conformed as a hook to cooperate with one end of a resilient spring 31 whose other end is anchored on a forwardly projecting portion 32 of a bracket 33 which is pivoted about a rivet 34 positioned in the upstanding portion 15a. Adjacent a central location, a slot 35 is provided in the bracket 33 to cooperate with a screw 36 which is in threaded relation with an aperture in the upstanding portion 15a so as to allow the bracket 33 to be fixed in a desired position after the spring 31 has been adjusted to a proper operating tension. This tension should be sufficient to hold the arm 28a of the bell-crank into cooperative relation at all times with an anchor pin 37, preferably riveted in position on the upstanding portion 15a so as to project into the path of the movement of the arm 28a.

As the stem 13 moves upwardly under contraction of the bellows 20 as effected by an increase in pressure in chamber 11, the relation between the pintle 30 of the bell-crank 28 and the anchor pin 37 cooperating with the arm 28a will change so as to cause the slide member 27 to move in arc across the surface of the resistance coil 24 to change the effective resistance in an extraneous circuit in some proportion to pressure impressed upon the bellows in the chamber 11. As the bellows moves upwardly, the resilient coil spring 31 will be extended under the influence of the movement of the stem 13, so that as the pressure impressed in the chamber 11 decreases, the bellows 20 will again expand to retract the pin 13 and allow the spring to maintain contactual relation between the arm 28a of the bell-crank and the anchor pin 37, so as to return the slide member 27 to its initial position.

To protect the active portions of the rheostatic device from atmospheric conditions, particularly from moisture, a metallic cap 40 is provided which completely encloses the parts as is clearly shown in Figure 1 and is provided at its lower end with an outwardly extending annular flange 41 which cooperates with the upper face of the body member 10. The flange 41 is adapted to be attached to the body member by means of an integral inturned flange 42 which is rolled over the outwardly extending flange 41. Gasket means 43 is provided between the outwardly extending flange 41 and the upper face of the body member 10 to form a leak-proof joint.

Referring to Figure 2, a side of the casing 40 which is adjacent the rear side of the upwardly extending portion 15a is provided with a flattened portion 40a and an intermediate boss 40b which is perforated to allow the mounting of binding posts 44 by means of hollow rivets 45. Insulating material 46 is provided to insulate the rivet 45 and binding post 44 from the cap 40. Two binding posts are preferably supplied in the cap member 40 being connected with the rivets 26 by means of connecting wires 47. The wires 47 are threaded through the aperture 45a of the hollow rivet 45 and are soldered at 46 to the rivet to form a leak-proof joint.

In this manner the ends of the rheostatic coil 24 are capable of being connected in an extraneous electric circuit through the medium of binding posts 44. The slide member 27 is mounted on the body member 10 and is grounded thereby, so that its position with reference to the resistance coil 24 is capable of determining the responsiveness of an indicating head referred to above in an extraneous circuit in a proportion to the pressure in the chamber 11.

Referring to Figure 3, a modification of pressure-responsive devices is shown in which spring 18a, positioned on the interior of the bellows 20, is made relatively shorter than the distance between the bottom 19 of the bellows and the plate, so that the spring 18a does not become effective to restrain the collapse of the bellows under change of pressure about the bellows until the bellows has collapsed a predetermined distance, at which position the spring will contact the plate 15. This construction allows the bellows to respond at a pressure relatively lower to give a predetermined deflection than that pressure which is necessary to give the same deflection when both the bellows and the spring 18a are acting to restrain movement of the stem 13. This as particularly advantageous if a bellows is selected which is capable of being completely collapsed when subjected to a relatively low pressure, for example, 15 pounds per square inch. When the pressure of 15 pounds per square inch is imposed upon the exterior of the bellows, the bellows will give its maximum deflection, so that any further increase in pressure will be ineffective to change its position. If a spring 18a is now positioned on the interior of the bellows, so that its ends will contact the bottom 19 of the bellows and the supporting plate 15 at a point where the bellows has as yet not attained its maximum deflection, it is clear that a pressure-responsive means may be provided which will respond to the relatively low pressures impressed upon the bellows, while the loading spring 18 is still free to give accurate readings of the low pressure values until such point of collapse of the bellows is attained at which the loading spring becomes effective. At this point, the pressures acting upon the bellows must be substantially increased to obtain the same deflection from the bellows because the deflection is restrained both by the resistance of the bellows and the loading spring 18a. The position of the slide 27 on the resistance coil 24 may, therefore, be calibrated with reference to a scale of an indicating head such as mentioned above in a manner that the first twenty per cent of deflection of the slide, as controlled by the contractive resistance of the bellows, may be made responsive to the low pressure values, while the remaining eighty per cent may be made responsive to the relatively high pressures as determined by the combined resistance of the bellows and the loading spring 18a. It is, of course, clear that the scale on the indicating instrument is calibrated, so that low scale readings will have relatively large scale divisions per unit pressure, while the high scale readings after the loading spring 18a has become effective in the bellows will have relatively small scale divisions per unit pressure.

Referring to Figure 4, a modification of this invention is shown, in which the pressure-responsive device is provided with a closed fluid-pressure system, in which a bulb 50, containing fluid, is connected to the pressure-responsive device by means of duct 51 located at a distance remote from the bulb 50. The bulb 50 is subjected to temperature change in an enclosed space S, so that the fluid in the bulb 50 will expand or contract in direct proportion thereto which, in turn, impresses this fluid expansion by a proportionate pressure upon the bellows in the chamber 11, so that a temperature-responsive device is obtained.

It is to be understood that the above detailed description of the present invention is intended to disclose an embodiment thereof to those skilled in the art, but that the invention is not to be construed as limited in its application to the details of construction and arrangement of parts illustrated in the accompanying drawing, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed:

1. In a device of the class described, a bellows, a cup-shaped container of relatively rigid material to partially enclose the bellows and form a pressure chamber on the exterior thereof, entry means for the pressure chamber to place the chamber in communication with a source of pressure, a resistance fixedly attached to the container, stem means attached to the bellows and adapted to move longitudinally therewith under varying pressures in the pressure chamber, guide means adjacent the entry means for the stem to maintain straight line motion, a bell-crank pivoted on the end of the stem means adjacent the resistance to translate the longitudinal movement of the stem means into a transverse movement, a slide means for the resistance attached to one arm of the bell-crank, a fixed fulcrum in the path of the other arm to oscillate the bell-crank under the longitudinal movement of the stem means to move the slide means across the resistance to vary the impedance in an extraneous signaling circuit, and resilient means holding the second arm of the bell-crank in contact with the fixed fulcrum.

2. In a device of the class described, a bellows, a cup-shaped container of relatively rigid material to partially enclose the bellows and form a pressure chamber on the exterior thereof, entry means for the pressure chamber to place the pressure chamber in communication with a source of variable pressure, stem means attached to the bellows at a central location and adapted to move longitudinally on the axis of the bellows under varying states of collapse of the bellows by pressures in the pressure chamber, guide means for the stem means adjacent the ends thereof to maintain straight line motion when moved by the bellows, a resistance fixedly attached to the container adjacent one end of the stem means, a bellcrank pivoted on the end of the stem means to translate longitudinal movement of the stem means into a transverse movement, a slide means for the resistance attached to one arm of the bellcrank, a fixed fulcrum in the path of the other arm to oscillate the bell-crank by the longitudinal movement of the stem means to move the slide means across the resistance to vary the impedance in an extraneous signaling circuit, and means holding the second arm of the bellcrank in contact with the fixed fulcrum.

3. In a device of the class described, a cup-shaped container of relatively rigid material, a bellows positioned in the cup-shaped container and fixedly attached thereto adjacent the lip of the container to form a pressure chamber between the bellows and the container, entry means for the pressure chamber to place the chamber in communication with a source of pressure, stem means positioned centrally of the bellows and adapted to move longitudinally therewith under collapse by varying pressures in the pressure chamber, guide means for the stem means adjacent each end thereof to maintain straight line motion during the movement of the stem means by the collapse of the bellows, stop means cooperating with the stem means to limit the movement of the stem means, a resistance fixedly attached to the container adjacnt one end of the stem means and adapted to lie substantially in the plane of motion of the stem means, a bellcrank pivoted on the end of the stem means adjacent the resistance having a slide attached to one arm thereof for moving across the resistance, a fixed fulcrum in the path of the other arm to oscillate the bellcrank by longitudinal movement of the stem means to move the slide means across the resistance to vary the impedance in an extraneous signaling circuit in proportion to a varying pressure active in the pressure chamber, and means for holding the second arm of the bellcrank in contact with the fixed fulcrum.

4. In a device of the class described, a cup-shaped container of relatively rigid material, a bellows attached to the lip of the cup-shaped container and extending into the hollow portion of the cup-shaped container to form a pressure chamber therewith on the exterior of the bellows, entry means in the cup-shaped container to place the pressure chamber in communication with a source of pressure, stem means extending centrally of the bellows and fixedly attached to the bottom thereof whereby the stem means is moved longitudinally with the bellows under collapse thereof by varying pressures in the pressure chamber, guide means for the ends of the stem means to maintain straight line motion of the stem means, stop means to limit the motion of the stem means under the influence of the bellows, a resilient means embracing the stem means and cooperating with the bellows to load the bellows, a resistance fixedly attached to the container in the plane of movement of the stem means, a bellcrank pivoted on the end of the stem means adjacent the resistance having a slide attached to one arm thereof to cooperate with the resistance, a fixed fulcrum in the path of the other arm of the bellcrank to oscillate the slide over the resistance under the longitudinal movement of the stem means in response to collapse of the bellows by varying pressures in the pressure chamber to vary the impedance in an extraneous signaling circuit in proportion to the pressure in the pressure chamber, and means for holding the second arm of the bellcrank in contact with the fixed fulcrum.

5. In a device of the class described, a cup-shaped container of relatively rigid material, a bellows attached to the lip of the cup-shaped container and adapted to extend into the interior thereof to form a pressure chamber therewith on the exterior of the bellows, entry means in the cup-shaped container to place the pressure chamber in communication with a source of pressure, a second cup-shaped container whose rim is attached to the lip of the first cup-shaped container to form a second pressure chamber with the interior of the bellows, stem means attached to the bellows and adapted to move longitudinally therewith by the collapse of the bellows under varying pressures in the first pressure chamber, guide means for each end of the stem means to maintain straight line motion, a resistance fixedly attached to the first container and positioned within the second container adjacent one end of the stem means, a bellcrank centrally pivoted on the end of the stem means adjacent the resistance having a slide attached to one arm thereof for movement over the resistance, a fixed fulcrum in the path of the other arm to oscillate the bellcrank under the longitudinal movement of the stem means to move the slide across the resistance, and means for holding the second arm of the bellcrank in contact with the fixed fulcrum.

JOSEPH I. LINER.